United States Patent Office 2,879,233
Patented Mar. 24, 1959

2,879,233
PROCESS FOR THE PREPARATION OF FOAMED POLYURETHANES

Henry A. Pace, Akron, Ohio, assignor to The Goodyear Tire & Rubber Company, Akron, Ohio, a corporation of Ohio No Drawing. Application May 13, 1955
Serial No. 508,323

4 Claims. (Cl. 260—2.5)

This invention relates to the preparation of flexible elastomeric cellular materials. More particularly, it relates to methods for preparing flexible elastomeric cellular structures formed from liquid reaction mixtures containing polyisocyanates and to improved products obtained by the use of these methods.

The production of flexible elastomeric cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. The polymeric materials contain active-hydrogen atoms which react with the isocyanate groups to further extend the molecular chains. The polyisocyanate reactant performs a three-fold function in the reaction mixture. It operates to chain-extend the polymeric material, to react with water to generate carbon dioxide gas, and to cross-link or cure the polymeric material. The liberated carbon dioxide causes the liquid reaction mixture to expand and foam with the resultant formation of a flexible cellular structure.

This three-fold function of the polyisocyanate in the reaction and the exothermic nature of some of the reactions involved have given rise to certain problems in the production of the flexible elastomeric cellular structures and to certain undesired properties in the finished product.

The reaction mixture itself is a fairly viscous liquid which, as the chain extension and curing reactions proceed, changes progressively into a more viscous liquid and finally into a cured resilient cellular solid. If the generation of the carbon dioxide is set off early in the overall reaction, the mixture is not sufficiently viscous and lacks the necessary internal strength to prevent the generated gas from rising to the surface and escaping. Sometimes this causes a partial collapse of the foamed reaction mixture resulting in a cured material which has a varying density and a relatively thick skin on its surface. Other times, this premature generation of gas causes a substantially complete collapse of the foamed mixture resulting in a substantially solid material instead of a cellular material. If, on the other hand, the gas is generated late in the course of the reaction, the elastic expansion of the mass is hindered with the result that the late-evolved gas diffuses through the mass creating foams of high density. Also the late-evolved gas tends to cause internal or surface rupturing of the foam to produce undesirable internal or surface fissures in the product.

Control of the reaction temperature is one means for effecting the generation of the gas at the desired time. However, this control is complicated by the exothermic nature of some of the reactions involved. It is believed that the exothermic heat generated while these various reactions are taking place contributes, at least in part, to a shrinkage of the cured material. This shrinkage results in cured objects which do not have the same shape and dimensions as the mold in which the reaction mixture is cast.

It is, therefore, the broad object of this invention to provide improved methods for producing flexible elastomeric cellular structures from reaction mixtures comprising polyisocyanate, water and an active-hydrogen-containing polymeric material. Another object is to provide consistently uniform, high quality products from these reaction mixtures. It is also an object to provide flexible elastomeric cellular structures which have substantially the same shape and dimensions as the mold in which they are formed. Still another object is to provide a control over the generation of gas in the reaction mixture. Other objects will appear as the description proceeds.

The objects of this invention are accomplished by first preparing a prepolymer from an active-hydrogen-containing polymeric material of specified molecular weight and acid number and a controlled amount of a diisocyanate, permitting the reaction between these materials to continue until substantially all of the exothermic heat of reaction has been generated and dissipated and then adding additional polyisocyanate and water to provide the cure for and the generation of gas in the reaction mixture.

By the term "active-hydrogen" used to describe the type of polymeric materials useful in the practice of this invention is meant those hydrogen atoms which are reactive as measured and determined by the Zerewitinoff method. Examples of active-hydrogen-containing polymeric materials which are useful in the practice of this invention are polyesters, polyesteramides, and polyalkylene ether glycols.

The polyesters are prepared by the condensation reaction between one or more glycols and one or more dibasic carboxylic acids. The polyesteramides are prepared from one or more glycols, one or more dibasic carboxylic acids and relatively small amounts of one or more bifunctional amino-bearing compounds such as amino carboxylic acids, amino alcohols, and diamines. Small amounts of trifunctional materials may be employed in preparing the active-hydrogen-containing polyesters and polyesteramides. The polyalkylene ether glycols are hydroxyl-terminated polyethers derived from alkylene oxides or glycols or from other heterocyclic ethers such as dioxolane. Further examples of these active-hydrogen-containing polymeric materials and methods for their preparation are described in United States Patents 2,625,531, 2,625,532, and 2,625,535 which show polyesters and polyesteramides and United States Patents 2,692,873 and 2,702,797 which show polyalkylene ether glycols.

The practice of this invention is limited to active-hydrogen-containing polymeric materials which have an average molecular weight of from 750 to 2,250 and, in the case of polyesters and polyesteramides, an acid number not greater than 5. This molecular weight range corresponds to active-hydrogen-containing polymeric materials which have a reactive number (the sum of the hydroxyl number and the acid number) of from 50 to 150. It is preferred to employ an active-hydrogen-containing polymeric material which has a reactive number of approximately 60, an acid number not greater than 2 and a corresponding approximate average molecular weight of 1870. Since water is reactive with the diisocyanate employed to form the prepolymer, the active-hydrogen-containing polymeric material should be substantially anhydrous and contain not more than 0.2% water by weight.

In the preparation of the prepolymer any diisocyanate or mixtures of diisocyanate may be employed. Those diisocyanates which are liquid at room temperature are much preferred. Representative examples of the diisocyanates which may be employed in the preparation of the prepolymer are hexamethylene diisocyanate; paraphenylene diisocyanate; meta-phenylene diisocyanate;

4,4'-diphenyl diisocyanate; 1,5-naphthalene diisocyanate; 4,4'-diphenylene methane diisocyanate; 4,4'-diphenyl ether diisocyanate; 3,3'-dimethyl 4,4'-diphenyl diisocyanate; and 3,3'-dimethoxy 4,4'-diphenyl diisocyanate. The preferred diisocyanates are the tolylene diisocyanates which are liquid at room temperature.

In preparing the prepolymer, the diisocyanate should be employed in a range from 0.90 to 1.10 mols per mole of active-hydrogen-containing polymeric material. If less than 0.90 mol of diisocyanate is employed, it has been observed that the finished product shows some tendency to shrink from the dimensions of the mold in which it is cast. If more than 1.10 mols of diisocyanate are employed, it has been observed that the finished products are relatively coarse in structure and are also subject to internal collapse of the cell structure.

According to the practice of this invention the active-hydrogen-containing polymeric material of specified average molecular weight and acid number is reacted with the above-indicated proportion of diisocyanate until the exothermic heat of reaction has been in large part generated and removed from the system. While this reaction can be accomplished at temperatures ranging from room temperature to 100° C. and times ranging from 20 minutes to 2 hours, it is preferred to prepare the prepolymer by permitting the reaction to proceed for from 20 minutes to 1 hour at temperatures between 50° C. and 70° C. Best results are obtained by reacting the diisocyanate with the active-hydrogen-containing polymeric material at approximately 60° C. for approximately 30 minutes. That amount of the available exothermic heat which must be generated and removed from the prepolymer system in order to achieve the objects of this invention can best be determined by comparing the internal or reaction temperature with the external or bath temperature. As the exothermic heat of reaction is generated the reaction temperature gradually rises above the bath temperature until a maximum temperature, perhaps 2 to 15 degrees above the bath temperature, is reached. The reaction temperature then slowly drops off. At the point when the reaction temperature reaches a maximum and begins to drop off, sufficient exothermic heat has been generated to produce the desired beneficial effects upon the finished products achieved by the preparation of the prepolymer.

The prepolymer prepared as described above should be cooled if necessary to room temperature after the exothermic heat has been evolved since the reaction between the diisocyanate and the polymeric material continues at a reduced rate. If the prepolymer is to be used immediately in the formation of the desired flexible cellular material, no particular precautions need be taken in regard to the storing of the prepolymer. However, if the prepolymer is to be kept for as much as several days before it is used, it should be stored under cool, anhydrous conditions in order to preserve the stability of the prepolymer against increase in viscosity.

After the prepolymer has been prepared in the manner described, it is processed into the finished cellular structure by adding to the prepolymer the polyisocyanate, water, and, if desired, a catalyst and other compounding ingredients, and permitting the complete reaction mixture to foam and cure. The foaming and gelation or cure of the reaction mixture will take place at room temperature although it is preferred to operate at temperatures between 50 and 60° C. for approximately 15 to 20 minutes, followed by a subsequent heat treatment of from 30 to 60 minutes at 80 to 100° C. after which the cellular structure can be removed from the mold or casting surface without distortion.

The practice of this invention is illustrated by the following example in which, unless otherwise specified, parts are shown by weight.

*Example 1*

A polyester (800 parts) prepared from adipic acid and 99 mol percent of diethylene glycol and 1 mol percent of N-methyl diethanol amine and having a hydroxyl number of 54.1 and an acid number of 1.8 was mixed with 69.6 grams of tolylene diisocyanate. A prepolymer was prepared from this mixture by heating the mixture for 15 minutes at a temperature of 65 to 81° C. The liquid prepolymer was cooled to room temperature and subsequently 100 parts thereof were mixed with 17.9 parts of tolylene diisocyanate, 0.84 part of an accelerator prepared by condensing butyraldehyde and aniline and 3.66 parts of water. After thoroughly blending the mixture, it was poured into a steel mold coated with polytetrafluoroethylene to eliminate any possible adhesion between the foam and the mold surfaces. The foam rise was complete in approximately 3½ minutes and the foamed structure was permitted to cure for 20 minutes at 50 to 60° C. followed by 1 hour at 100° C. After removal of the cured cellular material from the mold, determinations showed that it had shrunk 1% from the dimensions of the mold which were 4 inches by 6 inches by 6 inches. The density of the cured material was 4.8 pounds per cubic foot.

A second sample was prepared as described in Example 1 except that no prepolymer was prepared and all of the reactants were mixed together without attempting first to generate and dissipate the exothermic heat of reaction. This sample foamed in substantially the same time, but during the cure, shrunk from all six sides of the cube-like sample to approximately ⅓ of its original volume. The deformity of the sample precluded density determination.

The catalyst employed in preparing both samples was prepared from approximately four mols of butyraldehyde and one mol of aniline. These condensation products and methods for their preparation are described in "The Journal of American Chemical Society," vol. 70, page 1624, for April 1948.

In addition to the preparation of the prepolymer as described in Example 1, other prepolymers were prepared at temperatures ranging from room temperature to 100° C. for times ranging from 20 minutes to 2 hours, with the higher temperatures being employed with shorter times and the lower temperatures with longer times. These prepolymers, from which a substantial part of the exothermic heat of reaction had been removed, produced, when reacted with water and polyisocyanate, consistently uniform, high quality, dimensionally stable, cellular reaction products.

While certain representative embodiments and details have been shown for the purpose of illustrating the invention, it will be apparent to those skilled in this art that various changes and modifications may be made therein without departing from the spirit or scope of the invention.

I claim:

1. In the process of preparing flexible elastomeric cellular products from reactants comprising an organic polyisocyanate, water and an active-hydrogen-containing polymeric material having an average molecular weight of from 750 to 2,250 and having an acid number not greater than 5, said polymeric material being selected from the group consisting of polyesters prepared from the condensation reaction between at least one dicarboxylic acid and at least one glycol, polyesteramides and polyalkylene ether glycols, the improvements which comprise first forming a prepolymer by reacting said polymeric material containing not more than 0.2% water by weight with from 0.90 to 1.10 mols of an organic diisocyanate per mol of said polymeric material until the exothermic heat of reaction has been generated and removed from the reaction mixture, and subsequently mixing additional organic polyisocyanate and water with said prepolymer.

2. In the process of preparing flexible elastomeric cellular products from reactants comprising an organic polyisocyanate, water and an active-hydrogen-containing polymeric material having an average molecular weight of from 750 to 2,250 and having an acid number not greater than 5, said polymeric material being selected from the group consisting of polyesters prepared from the condensation reaction between at least one dicarboxylic acid and at least one glycol, polyesteramides and polyalkylene ether glycols, the improvements which comprise first forming a prepolymer by reacting said polymeric material containing not more than 0.2% water by weight with from 0.90 to 1.10 mols of an organic diisocyanate per mol of said polymeric material at a temperature between room temperature and 100° C. until the temperature of the reaction mixture has reached a maximum, cooling he reaction mixture to remove the heat of reaction generated and subsequently mixing additional organic polyisocyanate and water with said prepolymer.

3. In the process of preparing flexible elastomeric cellular products from reactants comprising an organic polyisocyanate, water and a polyester prepared from the condensation reaction between at least one glycol and at least one dicarboxylic acid, said polyester having an average molecular weight of from 750 to 2,250 and having an acid number not greater than 5, the improvements which comprise first forming a prepolymer by reacting said polyester containing not more than 0.2% water by weight with from 0.90 to 1.10 mols of tolylene diisocyanate per mol of said polyester until the generation of the exothermic heat of reaction has been substantially completed, removing the generated heat of reaction and subsequently mixing organic polyisocyanate and water with said prepolymer.

4. In the process of preparing flexible elastomeric cellular products from reactants comprising an organic polyisocyanate, water and a polyester prepared from the condensation reaction between at least one glycol and at least one dicarboxylic acid, said polyester having an average molecular weight of approximately 1870 and an acid number not greater than 2, the improvements which comprise first forming a prepolymer by reacting said polyester containing not more than 0.2% water by weight with an approximately equal molecular amount of tolylene diisocyanate for approximately 30 minutes at 60° C., removing the exothermic heat generated by the reaction, adding water and approximately 2 mols of tolylene diisocyanate per mol of polyester to said prepolymer and foaming and curing the reaction mixture first for 15 minutes at 50 to 60° C. and then for approximately 1 hour at 100° C.

References Cited in the file of this patent
UNITED STATES PATENTS

| | | |
|---|---|---|
| 2,621,166 | Schmidt et al. | Dec. 9, 1952 |
| 2,692,874 | Langerak | Oct. 26, 1954 |
| 2,702,797 | Rugg | Feb. 22, 1955 |
| 2,713,884 | Schwartz | July 26, 1955 |

OTHER REFERENCES

Heiss et al.: "Preparation of Polymers from Diisocyanates and Polyols," Ind. Eng. Chem., July 1954, page 1502.

White: "Some Applications of Organic Isocyanates," Journal of the Society of Dyers and Colourists, vol. 70, No. 11, November 1954, page 485.

Abernathy: "Isocyanates and Their Reaction Products," Rubber World, vol. 131, No. 6, March 1955, page 766.